United States Patent
Reust et al.

[15] 3,675,300
[45] July 11, 1972

[54] LEAD WIRE INSERTING MECHANISM FOR STATOR WINDING APPARATUS

[72] Inventors: Paul H. Reust; Donald R. Taube, both of Fort Wayne, Ind.

[73] Assignee: Essex International Inc., Fort Wayne, Ind.

[22] Filed: Aug. 28, 1970

[21] Appl. No.: 67,950

[52] U.S. Cl. ........................................29/205 C, 29/205 D
[51] Int. Cl. ...............................H02k 15/00, H02k 15/06
[58] Field of Search..........29/205 C, 205 CM, 205 R, 205 D, 29/203 R

[56] References Cited

UNITED STATES PATENTS 3,557,433  1/1971  Sheldon ...............................29/205 C

*Primary Examiner*—Thomas H. Eager
*Attorney*—Hood, Gust, Irish & Lundy

[57] ABSTRACT

Apparatus for inserting external lead wires in slot dynamoelectric machine stator core slots and for positioning coils in the slots over the lead wires thereby to anchor the same. Elongated tubes are provided having inner and outer ends with the lead wires extending therethrough. The inner tube ends are inserted in the bore of the core adjacent the slot entrances and the lead wires are advanced so that end portions extend outwardly from the inner tube ends and from one end of the core. First clamping members are provided movable laterally between extended positions in which they initially engage the lead wire end portions and retracted positions in which they pull the end portions laterally outwardly away from the bore. The tubes are then withdrawn from the bore to a retracted position with their inner ends spaced longitudinally from the other end of the core and with other lead wire portions extending between their inner ends and the core. Second clamping members are provided movable laterally between extended positions in which they engage the other lead wire portions and retracted positions in which they pull the other lead wire portions laterally outwardly away from the bore, retraction of both clamping members thereby laterally pulling the respective lead wire portions outwardly away from the bore and seating the lead wires against the bottoms of the slots. With the lead wires thus clamped, coils are positioned in the slots over the lead wires therein, as by being directly wound in the slots by a gun-type coil winder. Following positioning of the coils in the slots over the external leads, the other lead wire portions are severed and lanced on either side thereof to provide strippable ends for the other lead wire portions and the end portions of the next lead wires.

22 Claims, 24 Drawing Figures

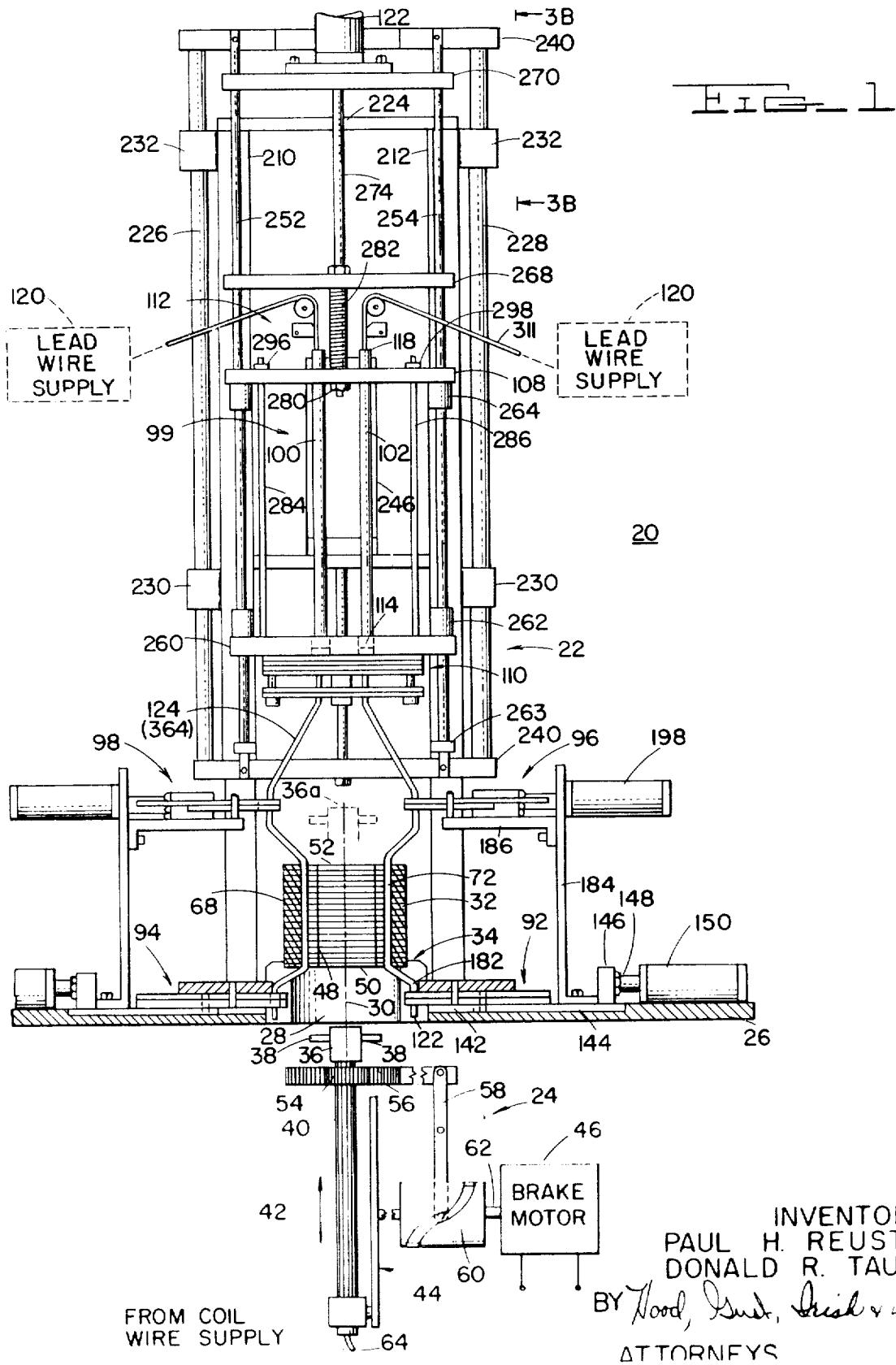

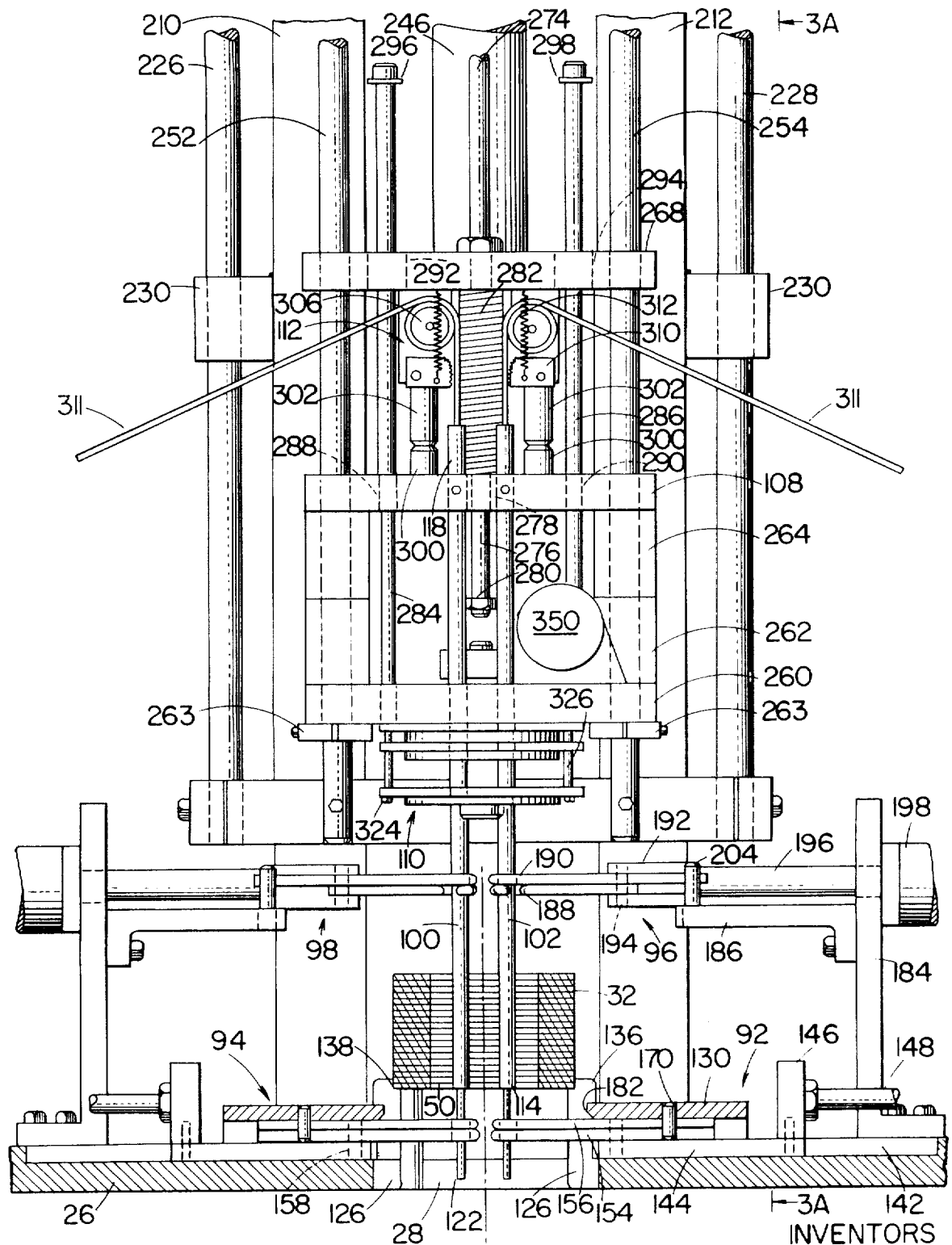

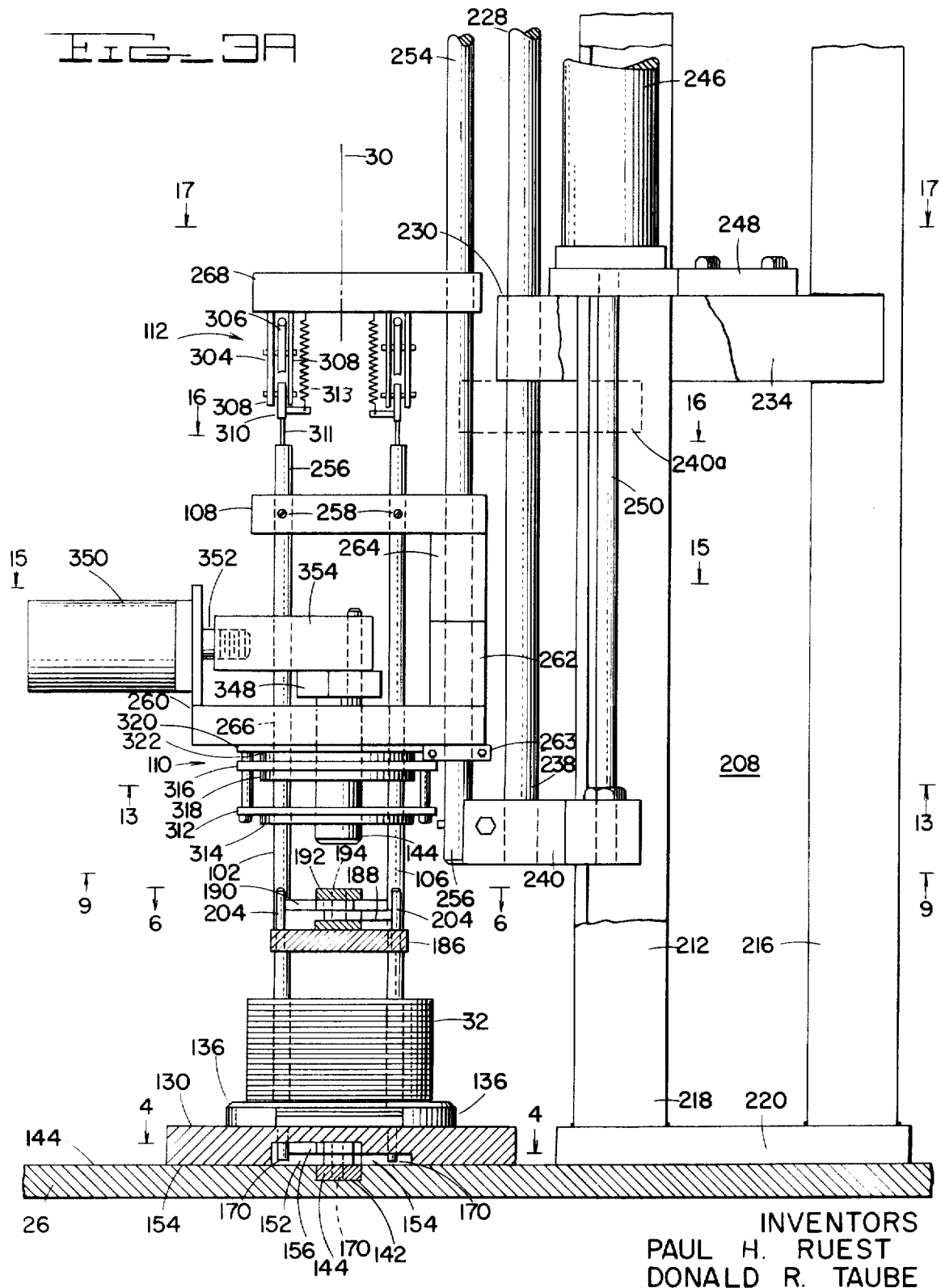

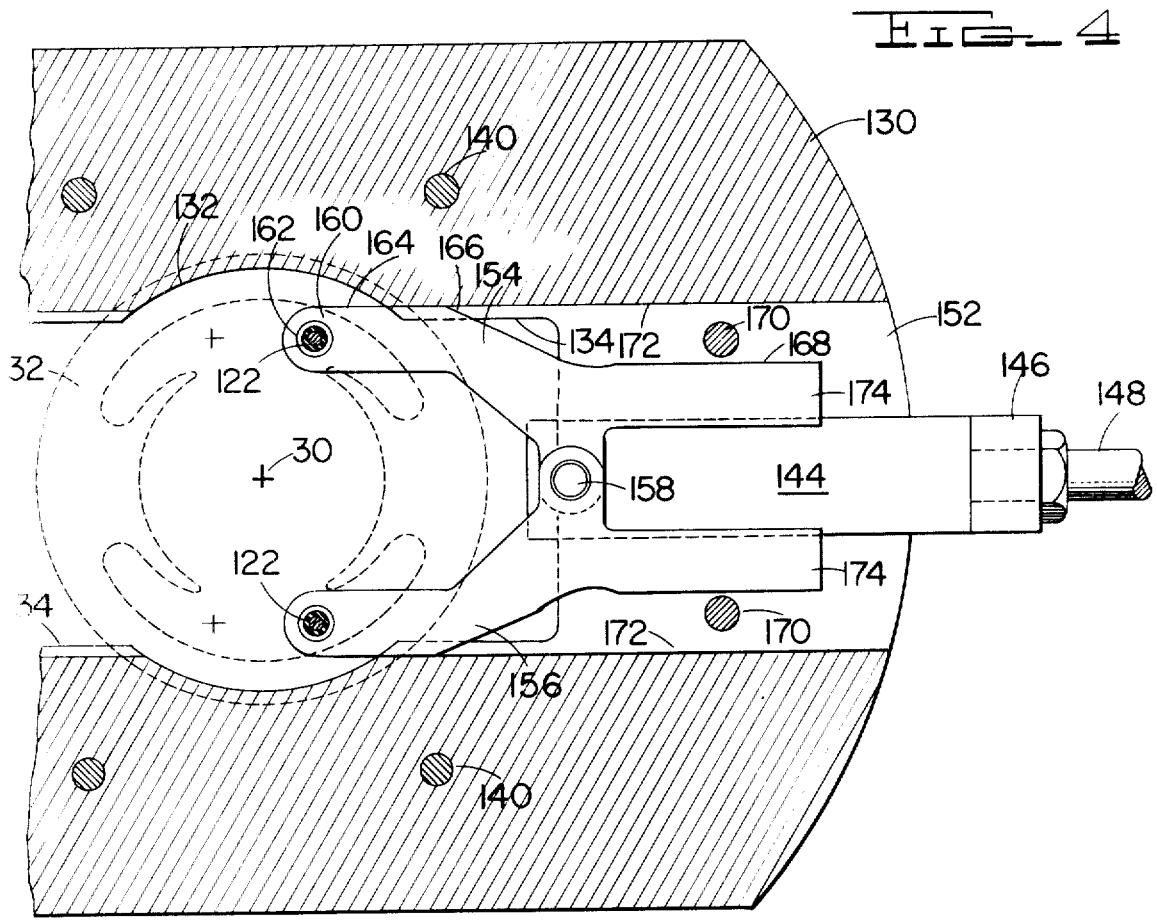
Fig_4
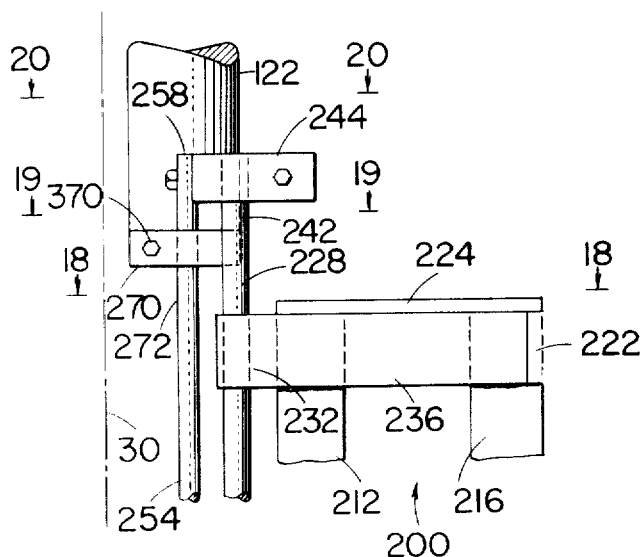
Fig_3B
INVENTORS
PAUL H. REUST
DONALD R. TAUBE
BY Hood, Gust, Irish & Lundy
ATTORNEYS

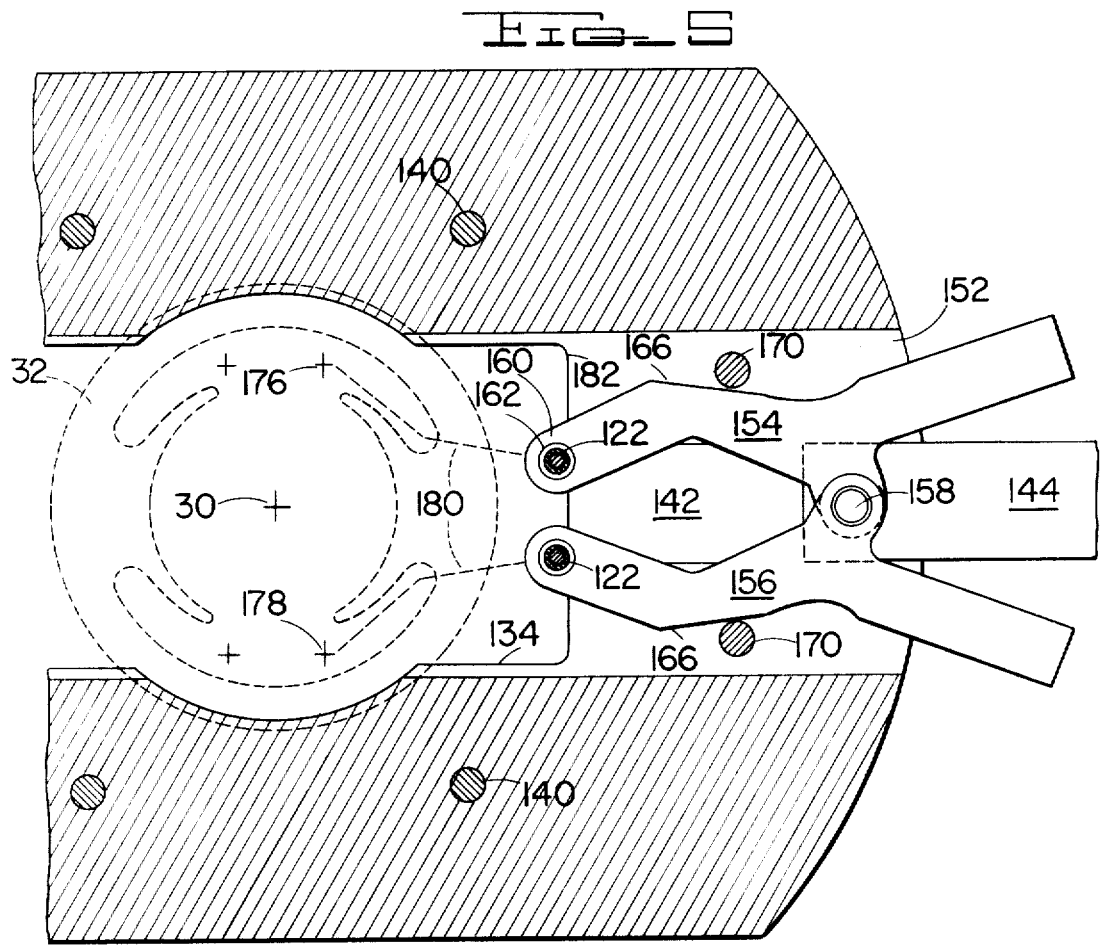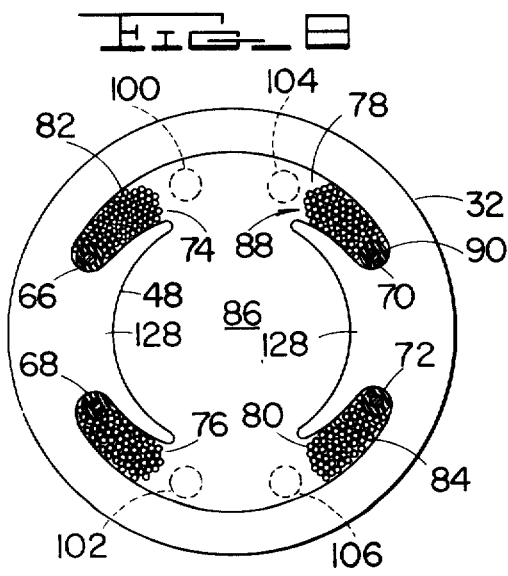

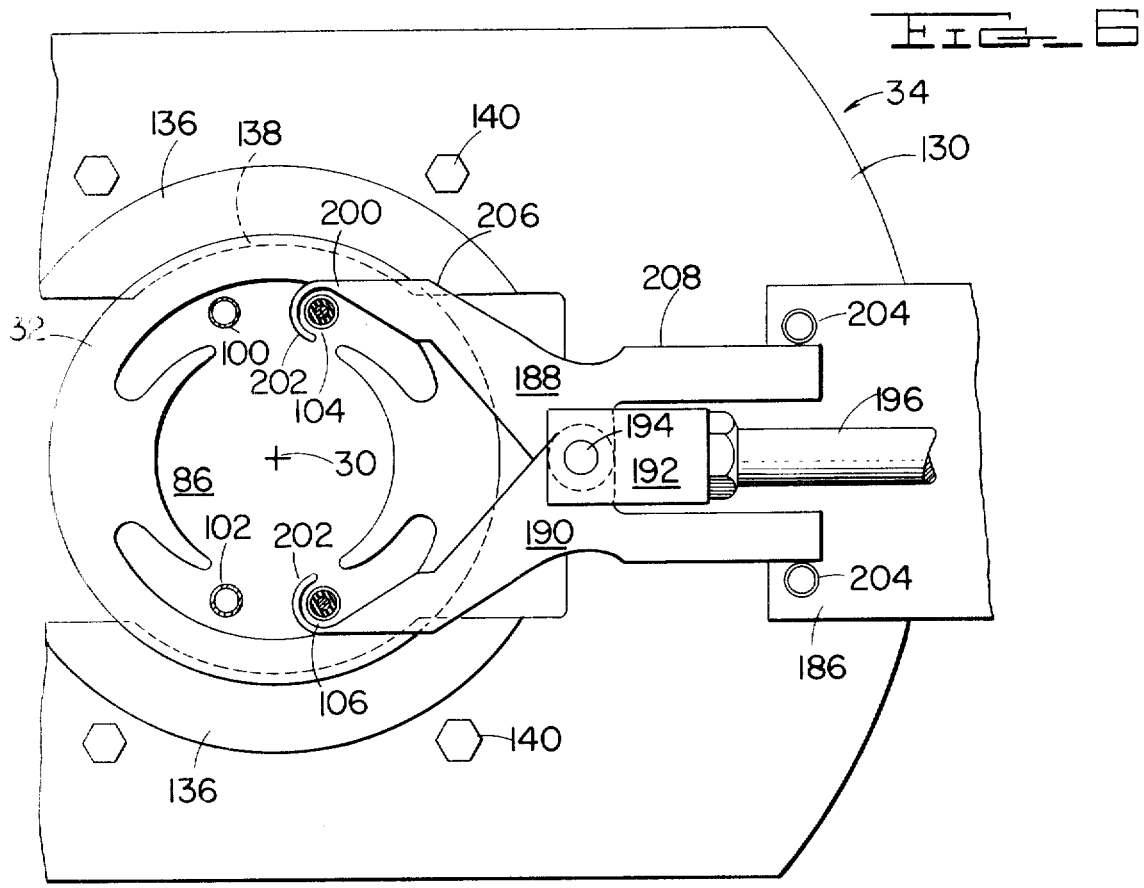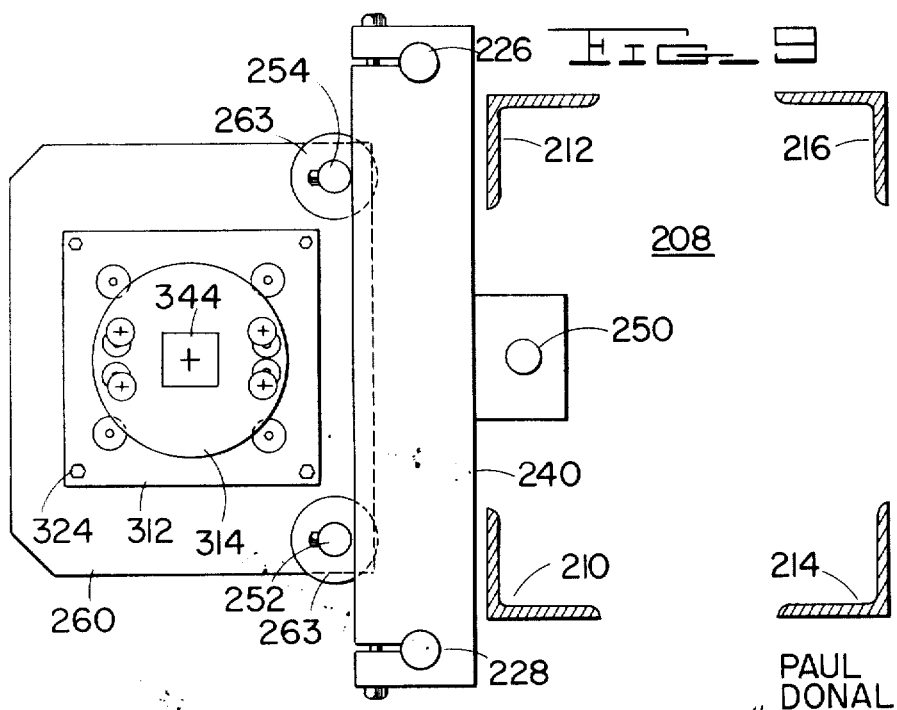

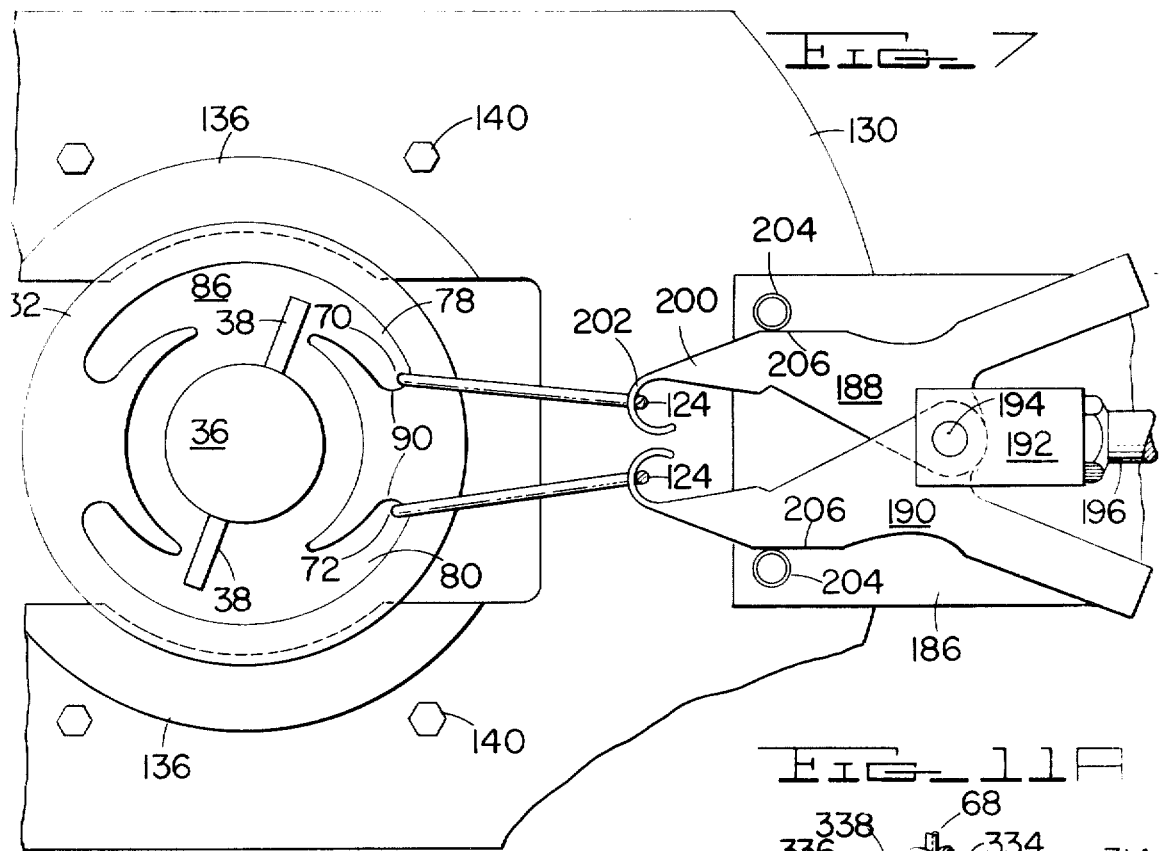
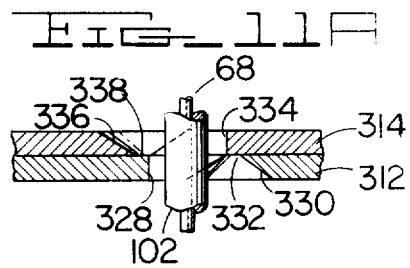
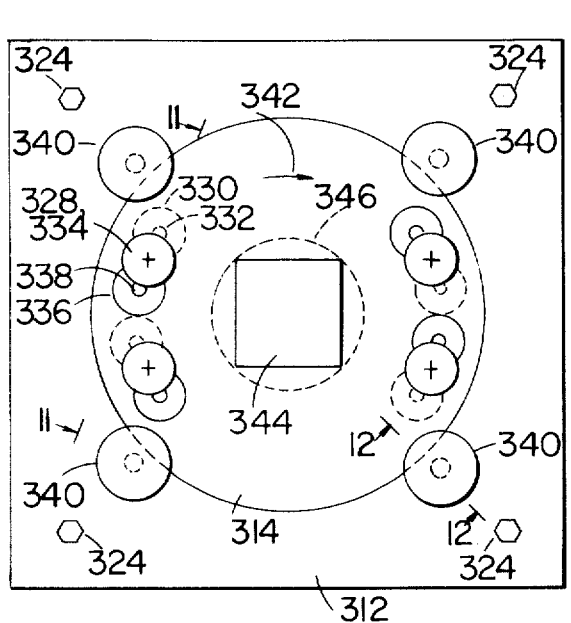
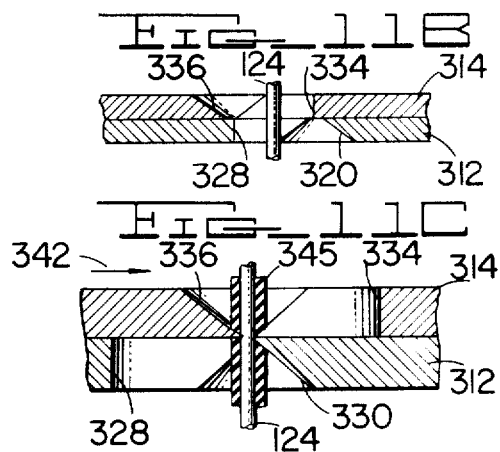

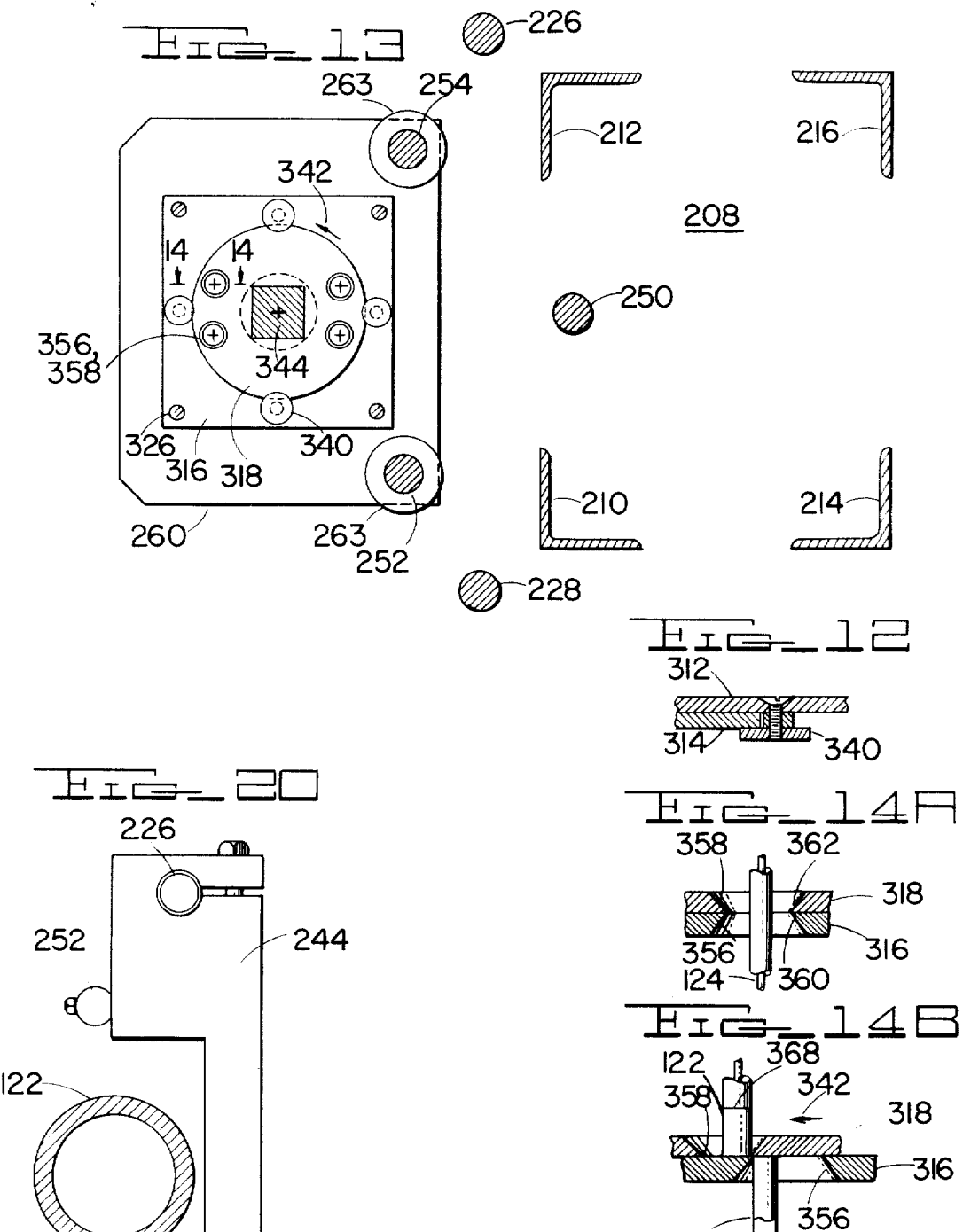

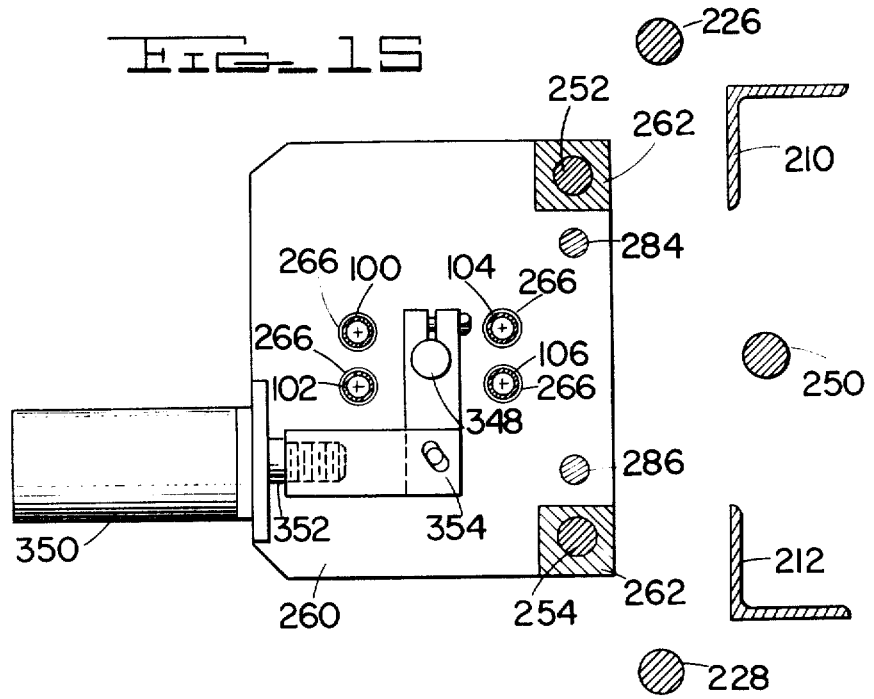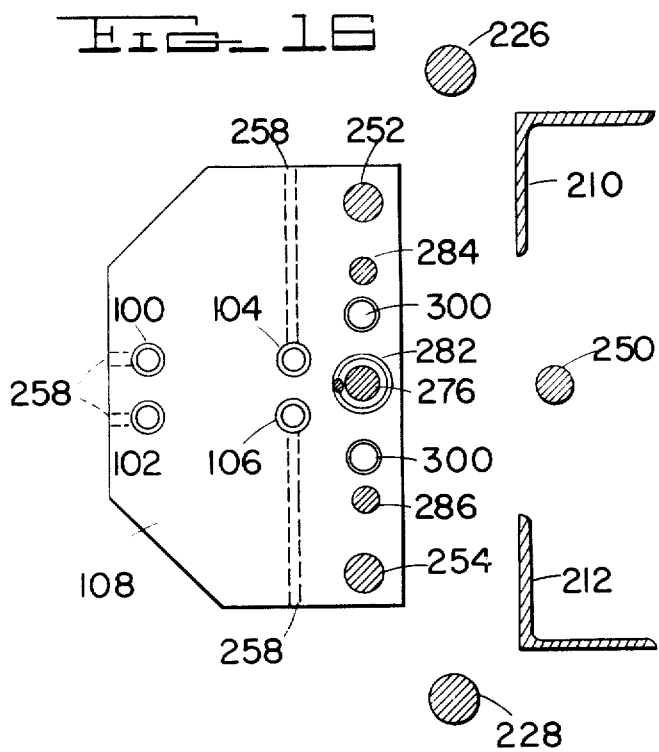

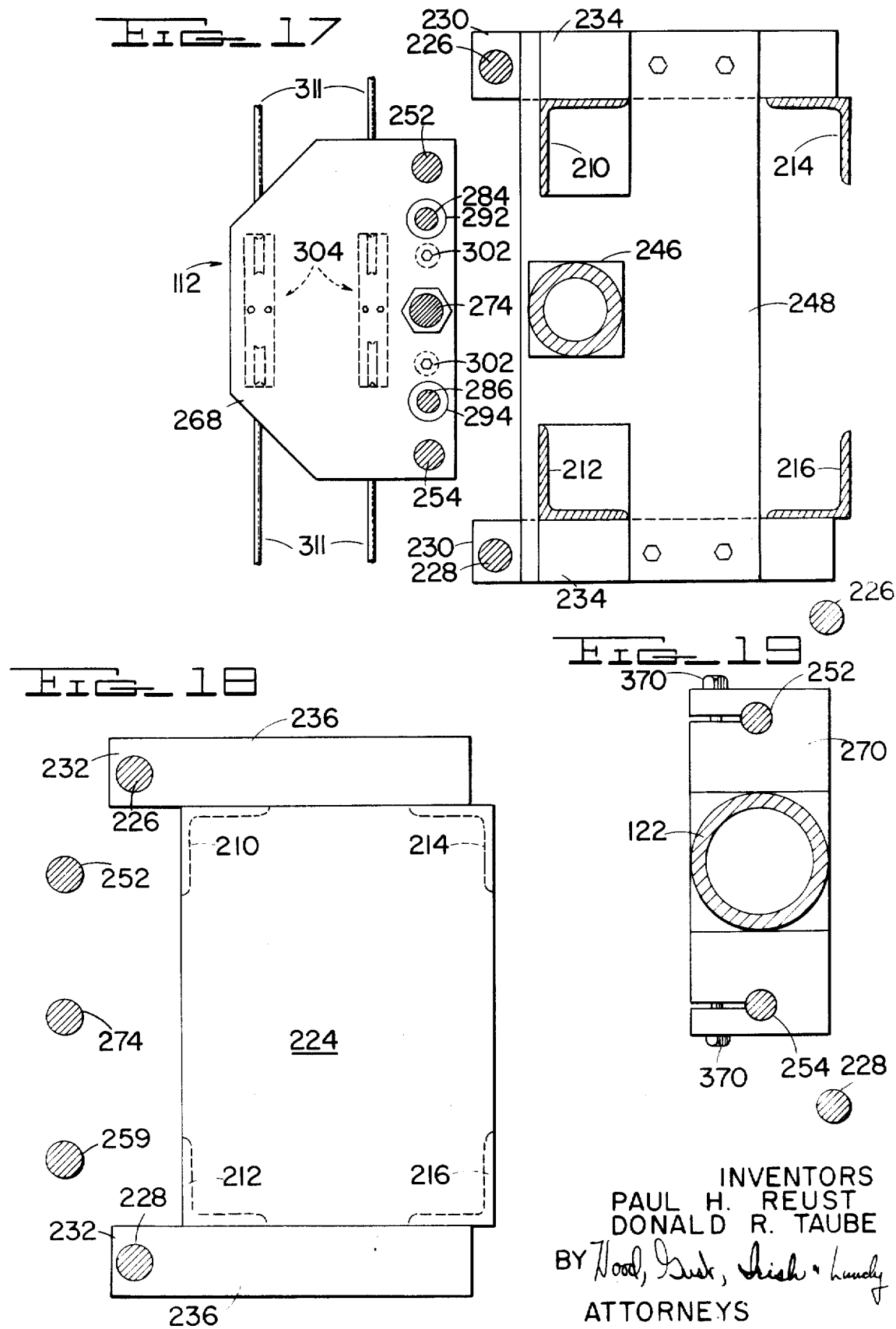

LEAD WIRE INSERTING MECHANISM FOR STATOR WINDING APPARATUS

BACKGROUND OF THE INVENTION

1. Field of the Invention

This invention relates generally to apparatus for positioning field coils in the slots of internally slotted dynamoelectric machine stator core members, and more particularly to apparatus for inserting external lead wires in respective slots and for positioning coil sides thereover, thereby to anchor the lead wires.

2. Description of the Prior Art

In certain types of dynamoelectric machines, particularly shaded pole motors and series universal motors, it has been a common practice to position external lead wires in slots of the stator core with the field coils being wound or otherwise positioned in the slots over the external lead wires thereby to anchor the lead wires. Ends of the lead wires extend beyond the opposite ends of the stator core, one such end of each lead wire being connected to a respective field coil and the other end being used for making external connections to the motor. In the past, such lead wires have been manually inserted in the respective slots prior to positioning of the coils therein, the lead wire ends being manually pulled away from the bore of the core and manually taped, and the coils then positioned in the core slots over the lead wires, as by winding the magnet wire forming the coil directly into the slots with a conventional gun-type coil winder. Following winding, the tape holding the ends of the lead wires is severed and removed.

Such manual insertion and taping of external lead wires has required appreciable operator time and has thus added appreciably to the cycle time for winding such stator cores. To the best of the present applicants' knowledge, no apparatus has been provided for inserting external lead wires in stator core slots prior to winding and for holding the end portions away from the core during the winding operation thereby eliminating the prior manual insertion and holding operation.

SUMMARY OF THE INVENTION

In its broader aspects, the invention provides apparatus for inserting at least one external lead wire in a respective slot of an internally slotted dynamoelectric machine stator core and for positioning a coil side in the slot over the lead wire thereby to anchor the same. The core has opposite ends and an opening extending longitudinally between its ends, the slot forming a part of the opening and having an entrance and a bottom. The apparatus includes means for supporting the core and means for feeding the lead wire longitudinally through the core opening with an end portion of the lead wire extending longitudinally beyond one of the core ends and another portion extending longitudinally beyond the other core end. Means are provided for respectively engaging the lead wire portions and for pulling the same laterally outwardly away from the core opening thereby to seat the lead wire against the bottom of the slot, and means are provided for positioning a side of a field coil in the slot over the lead wire while the end portions are pulled away from the opening by the engaging means.

In the preferred embodiment of the invention, the feeding means includes an elongated tube having the lead wire extending therethrough for guiding the lead wire into the core opening. The tube has opposite ends and means are provided for moving the tube longitudinally between an extended position with one of the tube ends extending into the core opening and with the end portion of the lead wire extending outwardly from the one tube end, and a retracted position with the one tube end longitudinally spaced from the other core end and the other lead wire portion extending from the one tube end. The preferred embodiment also includes means for severing the other portion of the lead wire when the tube is in its retracted position, and means for lancing the lead wire on either side of the severing means thereby to provide strippable ends for the lead wire portions.

It is accordingly an object of the invention to provide apparatus for inserting an external lead wire in a respective slot of an internally slotted dynamoelectric machine stator core and for positioning a coil side in the slot over the lead wire thereby to anchor the same.

The above-mentioned and other features and objects of this invention and the manner of attaining them will become more apparent and the invention itself will be best understood by reference to the following description of an embodiment of the invention taken in conjunction with the accompanying drawings.

BRIEF DESCRIPTION OF THE DRAWINGS

FIG. 1 is a front view, partly in cross-section, showing the apparatus of the invention with the feeding tubes and lead wire clamps retracted;

FIG. 2 is an enlarged, fragmentary, front view, partly in cross-section, showing the lower portion of the apparatus of FIG. 1 with the feeding tubes and clamps extended;

FIG. 3A is a fragmentary side view, partly in cross-section, taken generally along the line 3A—3A of FIG. 2;

FIG. 3B is a fragmentary side view showing the upper portion of the apparatus and taken generally along the line 3B—3B of FIG. 1;

FIG. 4 is a fragmentary top cross-sectional view taken generally along the line 4—4 of FIG. 3A and showing the bottom clamps extended;

FIG. 5 is a fragmentary top cross-sectional view similar to FIG. 4 but showing the bottom clamps retracted;

FIG. 6 is a fragmentary top cross-sectional view taken generally along the line 6—6 of FIG. 3A and showing the top clamps extended;

FIG. 7 is a view similar to FIG. 6 but showing the top clamps retracted;

FIG. 8 is a top view of a series motor stator core showing the external lead wires positioned in the slots thereof with the field coils positioned thereover;

FIG. 9 is a bottom cross-sectional view taken generally along the line 9—9 of FIG. 3A;

FIG. 10 is an enlarged bottom view of the lancing mechanism shown in FIG. 9;

FIGS. 11A, B and C are fragmentary cross-sectional views taken generally along the line 11—11 of FIG. 10 and showing the construction and operation of the lancing mechanism;

FIG. 12 is a fragmentary cross-sectional view taken generally along the line 12—12 of FIG. 10;

FIG. 13 is a bottom cross-sectional view taken generally along the line 13—13 of FIG. 3A;

FIGS. 14A and 14B are fragmentary cross-sectional views taken generally along the line 14—14 of FIG. 13 and illustrating the construction and operation of the lead wire severing mechanism of FIG. 13;

FIG. 15 is a top cross-sectional view taken generally along the line 15—15 of FIG. 3A;

FIG. 16 is a top cross-sectional view taken generally along the line 16—16 of FIG. 3A;

FIG. 17 is a top cross-sectional view taken generally along the line 17—17 of FIG. 3A;

FIG. 18 is a top cross-sectional view taken generally along the line 18—18 of FIG. 3B;

FIG. 19 is a top cross-sectional view taken generally along the line 19—19 of FIG. 3B; and FIG. 20 is a top cross-sectional view taken generally along the line 20—20 of FIG. 3B.

DESCRIPTION OF THE PREFERRED EMBODIMENT

Referring now to FIGS. 1-3 of the drawings, the apparatus of the invention, generally indicated at 20, includes lead wire inserting, cut-off and lancing mechanism 22, and conventional gun-type coil winding apparatus somewhat schematically shown at 24. Mechanism 22 is supported on base plate 26 forming a part of winding apparatus 24. Base plate 26 has an opening 28 therein coaxial with axis 20 of mechanism 22 and winding apparatus 24. Stator core member 32 is supported above base plate 26 coaxial with axis 30 by nest plate 34 secured to base plate 26. Conventional clamps (not shown) may be provided for removably securing core 32 on nest plate 34.

Coil winding apparatus 24 comprises a winding gun 36 having wire dispensing needles 38 thereon for directly winding magnet wire into the slots of core 32. Gun 36 is mounted at the upper end of hollow splined shaft 40. Shaft 40 and gun 36 are reciprocated on axis 30, as shown by arrows 42, by a conventional scotch yoke mechanism 44 driven by conventional brake-motor 46, gun 36 thus being reciprocated through bore 48 of core 32 between a lower position below bottom end 50 of core 32, as shown in solid lines in FIG. 1, and an upper position above upper end 52, as shown in dashed lines at 36A. Splined shaft 40 and gun 36 are rotatably oscillated by means of pinion 54 on splined shaft 40 engaged by rack 56. Rack 56 is linearly reciprocated by means of pivoted lever 58 driven by barrel cam 60 on motor shaft 62. Magnet wire 64 is fed from a source thereof (not shown) through hollow splined shaft 40 to dispensing needles 38. It will be understood that gun coil winder apparatus 24, per se, is conventional and need not further be described.

Referring briefly to FIG. 8, in the illustrated embodiment, apparatus 20 is adapted to insert lead wires 66, 68, 70, 72 in respective slots 74, 76, 78, 80 of stator core 32 of a conventional two-pole series universal motor, and to wind field coils 82, 84 in the slots over the lead wires, as shown. It will be observed that stator core 32 has an opening 86 extending between its opposite ends 50, 52, bore 48 and slots 74, 76, 78 and 80 forming a part of that opening. Each slot 74, 76, 78 and 80 has an entrance 88 and a bottom 90 against which the respective lead wire 66, 68, 70 and 72 is seated, thus being anchored by the respective coil side wound thereover in the slot.

Mechanism 22 generally comprises lower clamp assemblies 92, 94, upper clamp assemblies 96, 98, lead wire feeding tube assembly 99, lead wire cut-off and lancing assembly 110, and lead wire advancing assembly 112. Feeding tube assembly 99 includes lead wire feeding tubes 100, 102, 104, 106 having inner and outer ends 114, 118, with lead wires 66, 68, 70, 72, respectively, extending therethrough, the lead wires extending out of the outer ends 118 of the feeding tubes to extended-length lead wire supply sources, such as suitable reels, shown in dashed lines at 120 in FIG. 1. As will be hereinafter more fully described, feeding tubes 100, 102, 104, 106 are moved by support plate 108 and lead wire feed cylinder 122 between an extended position, as shown in FIGS. 2 and 3A, with their inner ends 114 extending substantially through core opening 86 to generally the level of lower end 50 thereof, and a retracted position with inner ends 114 substantially spaced from upper core end 52, as shown in FIG. 1. In their extended positions, tubes 100, 102, 104, 106 extend through core opening 86 adjacent the respective slot entrances 88, as shown in dashed lines in FIG. 8. As will hereinafter be more fully described, in the extended position of feed tubes 100 through 106, end portions 122 of lead wires 68 through 72, respectively, extend outwardly beyond inner tube ends 114 and lower end 50 of core 32, as best seen in FIG. 2. In the retracted position of tubes 100 through 106, lead wire portions 124 extend between inner tube ends 114 and upper core end 52, as best seen in FIG. 1.

Referring now additionally to FIGS. 4–7 of the drawings, diametrically opposite slots 126 (FIG. 2) communicate with opening 28 in base plate 26 for accommodating the usual winding shrouds (not shown) which are removably attached to pole shoes 128 of core 32. Nest plate assembly 34 comprises a plate member 130 having a central opening 132 therein coaxial with axis 30 and forming an extension of opening 28 in base plate 26. Diametrically opposite slots 134 in plate 130 communicate with opening 132 and are generally coextensive with slots 126 in base plate 26, slots 134 likewise accommodating the winding shrouds (not shown). Upwardly extending projections 136 on plate 130 have notches 138 formed therein which seat core 32. Plate 130 is secured to the upper surface of base plate 26 by suitable threaded fastener 140.

Lower clamp assemblies 92, 94 are identical, and thus description of clamp assembly 92 will suffice. Slot 142 is formed in upper surface 144 of base plate 26 extending laterally outwardly from slot 126. Slide 144 is reciprocably received in slot 142 and is moved between an extended position as shown in FIGS. 2 and 4, and a retracted position, as shown in FIGS. 1 and 5, by block 146 attached to piston rod 148 of conventional fluid power cylinder 150.

Slot 152 is formed in the bottom surface 154 of plate 130 extending laterally outwardly from opening 132. A pair of clamp members 154, 156 are provided in slot 152 pivotally connected intermediate their ends to slide 144, as at 158. Inner ends 160 of clamp members 154, 156, respectively, have holes 162 formed therein. Clamp members 154, 156, respectively, have outer surfaces 164, 166 and 168. Cam pins 170 are secured to plate 130 and extend into slot 152 to cooperate with outer surfaces 164, 166 and 168 of clamp members 154, 156. Referring particularly to FIG. 4, in the extended position of slide 144, cam pins 170 engage surfaces 168 of clamp members 154, 156 adjacent their outer ends 174 thereby separating inner ends 160, biasing outer surfaces 164 into engagement with sides 172 of slot 152, and positioning holes 162 in alignment with axes 176, 178 of tubes 104, 106. Thus, in the extended positions of clamp members 154, 156, holes 162 in ends 160 are positioned to receive end portions 122 of lead wires 70, 72.

Referring now particularly to FIG. 5, upon lateral retraction of slide 144 and clamp members 154, 156, cam pins 170 engage outer cam surfaces 166 thereby pivotally collapsing outer ends 60 of clamp members 154, 156 so as to pull end portions 122 of lead wires 70, 72 laterally outwardly away from core opening 86 and transversely inwardly toward each other, as shown by the dashed line 180 in FIG. 5. In the fully retracted position of slide 144 and clamp members 154, 156, end portions 122 of lead wires 70, 72 are clamped against rear edge 182 of slot 134.

Upper clamp assemblies 96, 98 are likewise identical and thus description of clamping assembly 96 will suffice. Support bracket 184 is secured to base plate 26 and extends upwardly therefrom. Support plate 186 is secured to bracket 184 and extends laterally therefrom toward axis 30. Clamp members 188, 190 are pivotally connected intermediate their ends to block 192, as at 194. Block 192 is connected to piston rod 196 of conventional fluid power cylinder 198 mounted on bracket 184. Block 192 and upper clamp members 188, 190 are laterally movable by means of cylinder 198 from an extended position, as shown in FIG. 6, to a retracted position as shown in FIG. 7.

Referring particularly to FIG. 6, outer ends 200 of clamp members 188, 190 have inwardly facing hook portions 202 formed thereon. Cam pins 204 are mounted on the upper surface of plate 186 and cooperate with outer surfaces 206, 208 of clamp members 188, 190. In the extended position of block 192 and clamp members 188, 190, cam pins 204 engage outer surfaces 208 thereby separating outer ends 200 of clamp members 188, 190 and positioning hook portions 202 in alignment with axes 176, 178 of tubes 104, 106. Thus, when clamp members 188, 190 are in their extended position, tubes 104, 106 may be extended to pass through hook portions 202 and core opening 86, as seen in FIG. 6.

Referring particularly to FIG. 7, when block 192 and clamp members 188, 190 are moved laterally to their retracted position by cylinder 198, cam pins 204 on plate 186 cooperatively engage outer cam surfaces 206 on clamp members 188, 190 thus camming outer ends 200 and hook portions 202 of the clamp members toward each other to their collapsed position. Thus, with lower clamp members 154, 156 retracted as above-described, and with lead wire feeding tubes 102, 106 retracted, as will hereinafter be described, retraction of the upper clamp members 188, 190 as above-described, will pull lead wire portions 124 laterally outwardly away from opening 86 and core 32 and inwardly toward each other thereby seating lead wires 70, 72 against the bottoms 90 of slots 78, 80. With lead wire end portions 122 thus pulled laterally away from core opening 186 by the retracted lower clamp members 154, 156, and the upper lead wire portions 124 similarly pulled away from core opening 86 by the upper clamp members 188, 190, winding assembly 24 may be actuated to wind coil 84 in slots 78, 80 over lead wires 70, 72.

Referring now additionally to FIGS. 9-20, an upstanding frame 208 is provided spaced rearwardly from axis 30 and comprising four upstanding angle members 210, 212, 214 and 216, respectively, having their lower ends 218 secured to a bottom plate member 220, as by welding, bottom plate 220 in turn being secured to base plate 26. Upper ends 222 of angle members 210 through 216 are secured to top plate 224, as by welding. A pair of main guide rods 226, 228 are provided respectively journaled in lower bushings 230 and upper bushings 232 mounted in lower and upper side bars 234, 236, respectively, secured to frame 208. Lower ends 238 of main guide bars 226, 228 are secured to lower cross bar member 240 and upper ends 242 are secured to upper cross bar member 244. Main guide bars 226, 228 are moved between a lower, extended position, as shown in solid lines in FIG. 3A, and an upper, retracted position, as shown in dashed lines at 240A, by mechanism feed cylinder 246 mounted on plate 248 supported on side bars 234, and having its piston rod 250 secured to lower cross bar 240. Lead wire feeding tubes 100 through 106, tube mounting plate 108, lead wire cut-off and lancing assembly 110, and lead wire advancing assembly 112 are simultaneously raised and lowered between extended and retracted positions by cylinder 246, as will hereinafter be described.

A pair of wire feed guide rods 252, 254, respectively, have their lower ends 256 secured to lower cross bar 240, and their upper ends 258 secured to upper cross bar 244. Lead wire feed tubes 100, 102, 104, 106 are secured adjacent their upper ends 256 to support plate 108 by means of suitable set screws 258. Support plate 108 is mounted on guide rods 252, 254 for movement thereon as will be hereinafter described.

Cut-off and lancing assembly 110 is supported on support plate 260. Support plate 260 is mounted on guide rods 252, 254 for movement thereon, as will be described. The lowermost position of support plate 260 and cut-off and lancing assembly 110 is determined by stops 62 adjustably secured to guide rods 252, 254. The minimum spacing of support plates 108, 260 is determined by spacers 262, 264. Feed tubes 100, 102, 104, 106, respectively, extend through openings 266 in support plate 260. Thus, in the extended position of feed tubes 100 through 106, stops 263 determine the desired position of inner feed tube ends 114 adjacent lower core end 50, support plate 260 abutting stops 263 and spacers 262, 264 abutting with support plate 108 thus being spaced above support plate 260, as shown in FIGS. 2 and 3A.

Lead wire advancing assembly 112 is mounted on support plate 268, also mounted on guide rods 252, 254 for movement thereon. Wire feed cylinder 122 is mounted on bracket 270 adjustably secured to guide rods 252, 254 adjacent their upper ends 272. Piston rod 274 of wire feed cylinder 122 is directly secured to support plate 268 and thus, support plate 268 and wire advance assembly 112 is directly moved between an extended position, as shown in FIGS. 2 and 3A, and a retracted position, as shown in FIG. 1, by a corresponding extension and retraction of piston rod 274 of cylinder 122.

Piston rod 274 has an extension portion 276 which extends through support plate 268 and through clearance opening 278 in support plate 108, piston rod extension portion 276 having an abutment 280 at its lower end. Coil spring 282 surrounds piston rod extension 276 and extends between support plates 268, 108. Piston rod extension 276 and spring 282 provide a lost-motion connection between support plates 268, 108. Thus, with piston rod 274 extended and support plates 260, 108 and 268 in their extended positions, as shown in FIG. 2, spring 282 is compressed and extension portion 276 of piston rod 274 extends through and below feed tube support plate 108, as shown in FIG. 2. Upon initial retraction of piston rod 274, support plate 268 will move upwardly and spring 282 expands, support plate 268 separating from support plate 108 until abutment 280 engages support plate 108, at which point retraction of piston rod 274 also retracts support plate 108.

A lost-motion connection is also provided between feed tube support plate 108 and cut-off and lancing assembly support plate 260. Rods 284, 286 are secured to support plate 260, extend upwardly through clearance holes 288, 290 in support plate 108, and upwardly through larger clearance holes 292, 294 in support plate 268, rods 284, 286 having abutments 296, 298 at their upper ends. Thus, upon retraction of piston rod 274 of wire feed cylinder 122 from its extended position, as shown in FIG. 2, lead wire advance assembly support plate 268 first retracts, followed by retraction of feed tube support plate 108, as above-described. Retraction of support plates 108, 268 then continues with abutments 296, 298 at the upper ends of rods 284, 286 passing through enlarged openings 292, 294 in support plate 268 until they engage the upper surface of support plate 108. At that point, engagement of abutments 296, 298 on rods 284, 286 with the upper surface of feed tube support plate 108 causes retraction of cut-off and lance assembly support plate 260 to the position shown in FIG. 1.

Upon extension of piston rod 274, support plate 268 is directly moved downwardly from its retracted position, and support plate 108 under the influence of spring 282 remains in engagement with abutment 280 on piston rod extension 276 and likewise moves downwardly. Support plate 260 moves downwardly under its own weight until it engages stops 263. Plates 108, 268 then continue their downward movement until spacers 264 attached to plate 108 engage spacers 262 attached to plate 260 thereby arresting downward movement of plate 108. Plate 268 then continues its downward movement compressing spring 282, downward movement of plate 268 toward plate 108 being arrested by engagement of stop pins 300 extending upwardly from plate 108 and stop pins 302 extending downwardly from plate 268. Downward movement of plate 108 extends the feeding tubes 100 through 106 downwardly to their extended positions within core opening 86, and downward movement of plate 268 following arresting of the downward movement of plate 108 advances the lead wires through the tubes and beyond the inner ends 114 thereof to provide lower end portions 122.

Wire advancing assembly 112 comprises four pulley and no-back wire clamp assemblies 304 which are identical and thus description of one will suffice. Each assembly 304 comprises a pulley 306 rotatably supported between a pair of brackets 308 secured to support plate 268 and depending therefrom. Upper portion 311 of the respective lead wire which extends out of outer end 118 of the respective feed tube is trained around pulley 306 and extends therefrom to the respective lead wire supply source 120. No-back wire clamp 310 is pivotally mounted between brackets 308 and has a serrated surface cooperating with the respective lead wire. Clamps 310 are biased upwardly by a suitable coil spring 313. It will be observed that no-back wire clamps 310 permit the lead wire to be advanced downwardly through the respective feed tubes and withdrawal thereof from the inner ends 114, while inhibiting retraction of the lead wires from the tubes and withdrawal from the outer ends 118.

It will now be seen that with lead wire end portions 122 clamped by retraction of lower clamp assemblies 92, 94, as above-described, retraction of lead wire feed tubes 100 through 106 by plate 108 and retraction of plate 268, as above-described, will result in the withdrawal of a new length of lead wire from the supply source 120 and the advance of that new length into the feed tubes, such withdrawal and advance being accommodated by wire clamps 310. Following severing of lead wire portions 124, as will shortly be described, initial downward movement of plate 268 and engagement of clamps 310 with the lead wires causes the advance of new end portions 122 from inner ends 114 of the feed tubes. Clamps 310 prevent reverse withdrawal of the lead wires from the feed tubes during the subsequent downward movement of plate 108 and extension of feed tubes 100 through 106 into opening 86 and core 32, end portions 122 entering holes 162 in the extended lower clamp members 154, 156 as inner feed tube ends 114 approach bottom core end 50.

Lead wire cut-off and lancing assembly 110 comprises lower, cooperating, stationary and rotatable lancing plates 312, 314, intermediate, cooperating, stationary and rotatable cut-off plates 316, 318, and upper, cooperating, stationary and rotatable lancing plates 320, 322. Stationary plates 312, 316, and 320 are secured to support plate 260 in the desired spaced-apart relationship by suitable threaded fasteners and spacers 324, 326. Upper and lower cooperating stationary and rotatable lance plates 312, 314 and 320, 322 are identical and thus detailed description of lower lance plates 312, 314 will suffice. Referring particularly to FIGS. 10-12, stationary plate 312 has four holes 328 therethrough, respectively, in alignment with the axes of feed tubes 100 through 106 and of sufficient size to permit passage of the feed tubes therethrough. Countersunk openings 330 are formed in plate 312, respectively, on one side of hole 328 to define semicircular, sharp cutting edges 332 communicating with hole 328. Rotatable plate 314 has similar holes 334 therethrough of sufficient size to accommodate passage of feeding tubes 100 through 106, and similar countersunk openings 336 diametrically opposite countersunk openings 320 in plate 312 and again defining semicircular, sharp cutting edges 338 on the other side of hole 334. Rotatable plate 314 is supported in rotatable engagement with plate 312 by studs 340 (FIG. 12). Plate 314 is rotated in the direction shown by the arrow 342 between an inactive position and a lancing position by square post 344 extending through circular opening 346 in plate 312 and seated in square opening in plate 314. Post 344 has an upper rod portion 348 extending upwardly through plate 260. Post 344 and rotatable lancing plate 314 are rotated by means of a conventional fluid power cylinder 350 having its piston rod 352 coupled to lever 354 attached to post extension rod 348 (FIG. 15). It will thus be seen that extension of piston rod 352 will result in rotation of post 344 thereby to rotate plate 314 with respect to plate 312 in the direction shown by the arrow 342.

In the inactive position of rotatable lancing plate 314, holes 334 in plate 314 and 328 in plate 312 are aligned thereby to permit extension of the respective feeding tubes 100 through 106 therethrough, as seen in FIG. 11A. Upon retraction of the feeding tubes, as above-described, lead wire portions 124 extend through aligned holes 328, 334, as shown in FIG. 11B. Upon rotation of lancing member 314 in direction 342 to its lancing position, as shown in FIG. 11C, semicircular cutting edges 332, 338 formed by countersunk openings 330, 336, respectively, cut or lance insulation 345 on lead wire portion 124. It will be understood that countersunk openings 330, 336 are formed to provide semicircular cutting edges 332, 338 proportioned to lance insulation 345 without cutting the conductor therein.

Referring now to FIGS. 13 and 14, stationary cutting plate 316 is secured to support plate 260 by threaded fasteners and spacers 324, 326 and rotatable cutting plate 318 is rotated with respect thereto by post 344, being retained in engagement with stationary cutting plate 316 by studs 340. Stationary and rotatable cutting plates 316, 318, respectively, have four tapered holes 356, 358 therein of sufficient size to permit passage of feeding tubes 100 through 106 therethrough. Holes 356 in stationary cutting plate 316 are respectively aligned with the axes of the feeding tubes. When post 344 is positioned so that rotatable cutting plate 318 (along with rotatable lancing plates 314 and 322) is in its inactive position, holes 358 in rotatable cutting plate 318 are respectively aligned with holes 356 in stationary cutting plate 316 thereby to permit passage of the feeding tubes therethrough. It will be observed that holes 356, 358 are respectively inwardly tapered to define sharp cutting edges 360, 362. When rotatable cutting plate 318 is rotated by post 344 in the direction shown by the arrow 342 to its cutting position, as shown in FIG. 14B, sharp edges 360, 362 defined by holes 356, 358 sever lead wire portion 124 thereby providing another end 364 for the lead wire now anchored in the slots of core 32, and a new end 122 extending downwardly from inner end 114 of the respective feeding tube.

It will be observed that rotatable lancing plates 314, 322 are rotated to their lancing positions simultaneously with rotation of rotatable cutting plate 318 to its cutting position, thereby lancing lead wire ends 122, 364, as at 366, 368 thereby to provide readily strippable ends for those lead wire end portions. It will be readily understood that the length of spacers 326 may readily be varied in order to provide strippable ends of the desired length.

Reference to FIGS. 3B and 19 will show that the position of bracket 270 which supports wire feed cylinder 122 on guide rods 252, 254 is selectively adjustable by means of threaded fasteners 370. This permits selective adjustment of the position of the wire feed cylinder 122 in order selectively to adjust the retractive movement of feeding tubes 100 through 106 and, in turn, the lengths of the upper lead wire portions 124. Stop pins 302 of different lengths are employed in order to determine the length of the lead wire end portions 122.

It will be observed that mechanism feed cylinder 246 is employed, when required, in order to retract the entire assembly of cutoff and lancing assembly 110, feeding tube assembly 99, lead wire advancing assembly 112 and wire feed cylinder 122 sufficiently to permit loading and unloading of core 32. Such retraction is necessitated when relatively short lead wire portions 124 are specified which, in turn, dictates a shorter stroke for wire feed cylinder 122 such that lead wire cut-off and lancing assembly 110 is not retracted sufficiently to permit loading and unloading of core 32. If relatively long lead wire portions 124 are specified, wire feed cylinder 122 is positioned to provide a proportionately longer stroke resulting in retraction of lead wire cut-off and lancing mechanism 110 sufficiently to permit loading and unloading of core 32, thus eliminating the need for retracting mechanism feed cylinder 246 so as further to retract the entire assembly.

OPERATION

With no core 32 positioned on nest plate 34, mechanism feed cylinder 246 is retracted (if need be) thereby to retract the entire lead wire feeding mechanism, wire feed cylinder 122 is retracted, support plate 268 and lead wire advancing assembly 112 is fully retracted, feed tube support plate 108 and feeding tubes 100 through 106 are retracted by engagement of abutment 280 on piston rod 274 with support plate 108, lead wire cut-off and lancing assembly 110 and support plate 260 are retracted by abutments 296, 298 on pins 284, 286 with inner tube ends 114 being disposed within holes 266 in support plate 260, as shown in FIG. 1, lower clamp assemblies 92, 94 are extended, and upper clamp assemblies 96, 68 are retracted.

An unwound core 32 is then loaded on nest plate 34, upper clamp assemblies 96, 98 are extended, and mechanism feed cylinder 246 is extended (if need be) thereby to extend the entire lead wire feeding mechanism to the position shown in FIG. 1. Wire feeding cylinder 122 is then extended resulting in immediate extension of support plate 268 together with lead wire advancing assembly 112 thereon, support plate 108 together with feeding tubes 100 through 106 secured thereto, and support plate 260 together with lead wire cut-off and lancing mechanism 110 attached thereto. It will be observed that engagement of no-back wire clamps 310 with the respective lead wire portion 311 prevents the lengths of lead wire which extend through the respective feeding tubes 100 through 106 from being withdrawn from outer tube ends 118 during such extension. Extension of support plate 260 continues until arrested by its engagement with stops 263 on guide rods 252, 254. As extension of support plate 108 continues, inner ends 114 of feeding tubes 100 through 106 pass through hook portions 202 of upper clamp members 188, 190, and enter core opening 86, extension of support plate 108 and feeding tubes 100 through 106 being terminated by engagement of spacers 262, 264. Extension of support plate 268 then continues compressing spring 282 until stop pins 308 engage stop pins 300, this further extension of support plate 268 and lead wire advancing assembly 112 extending lead wire end portions 122 outwardly from inner tube ends 114 and through holes 162 in lower clamp members 154, 156. Lower clamp assemblies 92, 94 are then retracted so as to pull lead wire end portions 122 laterally outwardly away from core opening 86 and transversely inwardly toward each other and into clamping engagement with edges 182 of slots 134.

Wire feed cylinder 122 is then retracted resulting in immediate retraction of support plate 268 and wire advancing assembly 112. It will be observed that with the lead wire end portions 122 clamped by lower clamp assemblies 92, 94, retraction of support plate 268 and wire advancing assemblies 112 will withdraw a new length of lead wire from supplies 120. As soon as the lost-motion of extension portion 276 of piston rod 274 is taken up so that abutment 280 engage feed tube support plate 108, support plate 108 and feeding tubes 100 through 106 are retracted, thereby to withdraw inner tube ends 114 from core opening 86 and from hook portions 202 of upper clamp assemblies 96, 98, continued retraction of support plate 268 and wire advancing assemblies 112 continuing to withdraw lead wire from supply sources 120. Support plate 260 remains in engagement with stops 263 until abutments 296, 298 on rods 284, 286 pass through holes 292, 294 in support plate 268 and ultimately engage the upper surface of support plate 108. Continued retraction of wire feed cylinder 122 then retracts support plate 260 and lead wire cut-off and lancing mechanism 110 along with support plate 108, lead wire feeding tubes 100 through 106, support plate 268 and lead wire feeding assembly 112 until the desired lengths of lead wire portions 124 have been withdrawn from tube ends 114, as determined by the stroke of wire feed cylinder 122, as shown in FIG. 1.

Upper clamp assemblies 96, 98 are then retracted thereby pulling lead wire portions 124 laterally outwardly away from core opening 86 and transversely inwardly toward each other so as to seat lead wires 66 through 72 against the bottoms 90 of core slots 74 through 80. Coil winding apparatus 24 is then actuated to wind coils 82, 84 in slots 74 through 80 over lead wires 66 through 72, thereby anchoring the lead wires in place. Gun 36 of coil winding apparatus 24 is fully retracted at the end of the winding cycle, as shown in FIG. 1.

Cut-off and lancing mechanism 110 is then actuated by extension of cylinder 350 thereby to sever lead wire portions 124 to provide end portions 364 and new end portions 122, and to lance these end portions at points spaced from the point of severance thereby to provide strippable ends thereon. Mechanism feed cylinder 246 is then retracted (if need be) in order to retract the entire lead wire feeding mechanism, and lower clamp assemblies 92, 94 are extended in order to release the clamping of lead wire end portions 122. The fully wound core 32 is then unloaded, it being observed that the provision of hook portions 202 on upper clamp members 188, 190 permits ready removal of the severed lead wire end portions 364 therefrom.

It will be readily understood that a control system is desirably provided for automatically actuating the apparatus of the invention in the above-described sequence, and that such a control system may be of the type including appropriately located limit switches for actuating the various mechanisms in accordance with the desired sequence. Thus, after loading an unwound core 32 on nest plate 34, a "Start" switch may be actuated which will initiate extension of upper clamp assemblies 96, 98. When upper clamp assemblies 96, 98 are fully extended, a limit switch may be actuated which will initiate extension of mechanism feed cylinder 246 (if need be). Upon completion of extension of mechanism feed cylinder 246 and extension of the entire lead wire feeding assembly, a limit switch may be actuated to initiate extension of wire feed cylinder 122. Upon arrival of support plate 268 at its fully extended position, a limit switch may be actuated to initiate retraction of lower clamp assemblies 92, 94. Upon completion of retraction of lower clamp assemblies 92, 94, a limit switch may be actuated to initiate retraction of wire feed cylinder 122. Upon completion of retraction of support plate 268, a limit switch may be actuated to initiate retraction of upper clamp assemblies 96, 98. Upon completion of retraction of upper clamp assemblies 96, 98, a limit switch may be actuated to initiate operation of coil winding mechanism 24.

Upon completion of the coil winding operation, as determined by a conventional turns counter, operation of coil winding mechanism 24 is terminated and upon retraction of gun 36, a switch is actuated to initiate extension of cylinder 350 and operation of the lead wire cut-off and lancing mechanism 110. Upon completion of extension of cylinder 350, another limit switch is actuated immediately to retract cylinder 350. Upon completion of retraction of cylinder 350, a limit switch may be actuated to initiate retraction of mechanism feed cylinder 246 (if need be). Upon completion of retraction of mechanism feed cylinder 246, a limit switch may be actuated to extend lower clamp assemblies 92, 94 and to terminate the cycle of operation.

It will now be seen that the invention provides apparatus for inserting external lead wires in the slots of an internally slotted dynamoelectric machine stator core member and for positioning coils therein over the lead wires, the apparatus of the invention therefore eliminating lead wire placing operations formerly manually performed and thus substantially reducing the cycle time required for the production of a fully wound stator core.

While there have been described above the principles of this invention in connection with specific apparatus, it is to be clearly understood that this description is made only by way of example and not as a limitation to the scope of the invention.

What is claimed is:

1. Apparatus for inserting at least one external lead wire in a respective slot of an internally slotted dynamoelectric machine stator core and for positioning a coil side in said slot over said lead wire thereby to anchor the same, said core having opposite ends and an opening extending longitudinally between said ends, said slot forming a part of said opening and having a bottom, said apparatus comprising means for supporting said core, means for feeding said lead wire longitudinally through said opening with an end portion of said lead wire extending longitudinally beyond one of said core ends and another portion extending longitudinally beyond the other of said core ends, means for respectively engaging said lead wire portions and for pulling the same laterally outwardly away from said core opening to seat said lead wire against the bottom of said slot, and means for positioning a side of a field coil in said slot over said lead wire while said end portions are pulled away from said opening by said engaging means.

2. The apparatus of claim 1 wherein said feeding means includes an elongated tube having said lead wire extending therethrough for guiding said lead wire into said core opening, said tube having opposite ends, means for moving said tube longitudinally between an extended position with one of said tube ends extending into said core opening and with said end portion extending outwardly from said one tube end, and a retracted position with said one tube end longitudinally spaced from said other core end and with said other lead wire portion extending from said one tube end.

3. The apparatus of claim 2 wherein said one end of said tube in said extended position thereof extends substantially through said core opening.

4. The apparatus of claim 2 wherein said feeding means further includes means for advancing said lead wire through said tube thereby to extend said end portion from said one tube end; said engaging means including first and second clamp members respectively spaced from said core ends, and means for respectively laterally moving said clamp members between extended positions in which said lead wire portions are respectively engaged, and retracted positions in which said portions are pulled laterally outwardly away from said core opening, said end portion extending beyond said one end of said core and being secured by said first clamp member in said retracted position thereof whereby movement of said tube to said retracted position withdraws said lead wire therefrom with the other portion thereof extending between said other core end and said one tube end and being engaged and pulled by said second clamp member.

5. The apparatus of claim 4 wherein said lead wire extends out of the other end of said tube to an extended-length supply thereof whereby movement of said tube to said retracted position withdraws a length of lead wire from said supply.

6. The apparatus of claim 5 further comprising means for severing said other lead wire portion between said second clamp member and said one end of said tube in said retracted position thereof.

7. The apparatus of claim 6 further comprising means for lancing said lead wire respectively spaced from each side of said severing means thereby to provide strippable ends for said lead wire portions.

8. The apparatus of claim 5 wherein said first clamp member has an aperture formed therein for receiving said end portion of said lead wire, said second clamp member having a hook formed thereon for engaging said the other wire portion.

9. The apparatus of claim 1 wherein said slot has an entrance, said feeding means feeding said lead wire through said opening adjacent said slot entrance.

10. The apparatus of claim 1 wherein said positioning means comprises a gun-type winder for winding the wire forming said coil side directly into said slot.

11. The apparatus of claim 1 wherein said lead wire is withdrawn from an extended-length supply, and further comprising means for severing said other lead wire portion between said core and said supply.

12. The apparatus of claim 1 wherein there are two spaced slots each having an entrance and a bottom, said entrances being more widely spaced than said bottoms, and wherein there are two of said lead wires, said feeding means feeding said lead wires through said opening at location adjacent said slot entrances, respectively, said engaging means having a first position in which said portions of said lead wires are engaged at said locations and a second position in which said lead wires are seated adjacent the bottoms of said slots, respectively, and further comprising means for moving said engaging means between said first and said second positions thereof.

13. The apparatus of claim 12 wherein said engaging means includes first and second pairs of clamp members respectively spaced from said core ends, said moving means including means for moving said pairs of clamp members laterally outwardly and transversely inwardly from said first to said second positions thereof.

14. The apparatus of claim 13 wherein said moving means includes first and second actuator means for respectively independently so moving said pairs of clamp members.

15. The apparatus of claim 14 wherein each of said actuator means includes power means laterally movable between extended and retracted positions, means for pivotally connecting the respective pair of clamp members to said power means for movement between expanded and collapsed positions, and cam means cooperating with said clamp members for moving the same from said expanded to said collapsed positions responsive to movement of said power means from said extended to said retracted position, said clamp members being in said first position when said power means is in said extended position and in said second position when said power means is in said retracted position.

16. The apparatus of claim 1 wherein said feeding means includes an elongated, longitudinally extending tube for guiding said lead wire into said core opening, said tube having outer and inner ends, said lead wire extending through said tube and out of said outer end thereof to an extended-length supply thereof a supporting member having said tube secured thereto, an elongated, longitudinally extending guide member, means for mounting said guide member on aid supporting mean, means for mounting said supporting member on said guide member for longitudinal movement of said supporting member and tube between an extended tube position with said inner end thereof extending into said core opening and with said lead wire end portion extending outwardly from said inner tube end, and a retracted position with said inner tube end longitudinally spaced from said other core end and with said other lead wire portion extending from said inner end, and means for moving said supporting member and tube between said extended and retracted positions.

17. The apparatus of claim 16 further comprising means for severing said lead wire, a second supporting member intermediate said first-named supporting member and said other core end and carrying said severing means, means for mounting said second supporting member on said guide member for movement between extended and retracted positions, said tube extending through said severing means in said extended tube position, said inner tube end being spaced from said severing means and said other lead wire portion extending therethrough in said retracted tube position, means operatively connecting said first supporting member to said second supporting member for moving the same from said extended to said retracted position thereof in response to movement of said first supporting member and tube from said extended to said retracted position thereof, and means operatively connected to said severing means for actuating the same thereby to sever said other lead wire portion to provide another lead wire end portion.

18. The apparatus of claim 17 wherein said connecting means includes a lost-motion connection between said first and second supporting members whereby said second supporting member is retracted, a first predetermined distance thereby to provide said other lead wire end portion of predetermined length in response to said first supporting member and tube being retracted by a second predetermined distance greater than said first distance thereby to retract said inner tube end outwardly from said severing means.

19. The apparatus of claim 17 further comprising first and second means for lancing said lead wire carried by said second supporting means respectively on opposite sides of said severing means, said lancing means being operatively connected to said actuating means and actuated thereby to provide strippable ends for said lead wire portions.

20. The apparatus of claim 19 wherein each of said severing and lancing means includes first and second cooperating plate members, means for securing said first plate member to said second supporting member, said second plate member being rotatable with respect to the respective first plate member between an inactive and an active position, respective first and second plate members having openings therein which are aligned in said inactive position and through which said tube extends in said extended position and said other lead wire portion extends in said retracted position, said openings cooperating to sever and lance said other lead wire portion, respectively, in said active position, said second plate members being connected to said actuating means and rotated thereby between said inactive and active positions.

21. The apparatus of claim 17 wherein said first-mentioned mounting means comprises a second elongated, longitudinally extending guide member carried by said supporting means, means for movably mounting the assembly of said first-named guide member, first supporting member, tube, second supporting member and severing means on said second guide member for movement of said assembly from an extended, operative position to a retracted position thereby to permit loading an unwound core on said supporting means and unloading of the fully wound core therefrom, and means for moving said assembly between said position thereof.

22. The apparatus of claim 16 further comprising a second supporting member spaced outwardly from said first supporting member and said outer tube end, means for mounting said second supporting member on said guide member for movement between extended and retracted positions, means carried by said second supporting member for guiding said lead wire from said outer tube end to said source, no-back means carried by said second supporting member for permitting withdrawal of lead wire from said source while preventing withdrawal of said lead wire from said outer tube end, means operatively connecting said first supporting member to said second supporting member for moving the same from said extended to said retracted position thereof in response to movement of said first supporting member from said retracted to said extended position thereof thereby withdrawing lead wire from said source, said connecting means including a lost-motion connection whereby said second supporting member travels a predetermined additional distance to its extended position following arrival of said first supporting member and tube at said extended tube position thereby advancing said lead wire end portion from said inner tube end.

* * * * *